UNITED STATES PATENT OFFICE.

ERNEST LESLIE RANSOME, OF SAN FRANCISCO, CALIFORNIA.

BRICK.

SPECIFICATION forming part of Letters Patent No. 353,501, dated November 30, 1886.

Application filed May 12, 1886. Serial No. 201,908. (No specimens.)

*To all whom it may concern:*

Be it known that I, ERNEST LESLIE RANSOME, of the city and county of San Francisco, State of California, have invented an Improvement in Bricks; and I hereby declare the following to be a full, clear, and exact description of the same.

My invention consists of bricks or like molded articles manufactured from aqueous or volcanic tufas or tufaceous earths, such as are found in the State of California and elsewhere. These tufas vary in composition, some being silicious, some silicious and aluminous, some silicious, aluminous, and calcareous, some silicious and calcareous, and some calcareous.

My invention relates to the whole class of tufas, inasmuch as they all have the common properties desirable in this manufacture, as being in a comparatively soft and friable condition, easily pulverized and granulated, and possessing more or less chemical activity when properly treated, either alone or with the addition of a small percentage of lime.

My method of procedure is as follows: If the tufa is sufficiently calcareous, I burn it. If it contains more than sufficient lime, I burn but part of it and mix it with a portion unburned, or after burning it I mix it with other tufas that are deficient in lime. In burning I heat it until the lime becomes active, either by parting with its carbonic acid, or by parting with the water of hydration of its compound, or by the formation of new combinations. If it does not contain sufficient calcareous matter, I mix it with some that does, as before mentioned, or else I add lime, and where it does contain sufficient calcareous matter, but owing to attending circumstances it is cheaper to supply lime than to burn the tufa, I add lime to it in preference to burning. In all these cases, however, I so proportion my materials as to have from five to twenty per cent. of active lime in the material.

In cases where the tufa is expensive, sand or burned clay or crushed rock may be added; but they only tend to cheapen the product, while rendering it inferior in quality.

In all cases prior to molding I bring the material to the consistency of unrefined sugar by mixing it with water, and I then mold it under heavy pressure, and while a lighter pressure may produce a merchantable article I prefer to use a powerful press, exerting a pressure of not less than one hundred tons to a brick.

In special cases, for an enameled brick, I subject the bricks formed from the compound tufas to a red heat, upon exposure to which they in a short time vitrify and become glazed.

Any of these bricks can be beautifully colored by the addition of almost any of the mineral pigments commonly used in the art, with the exception of those produced from the purely calcareous tufas. The bricks made by this process are hard, durable, hydraulic, and impervious to water.

I am aware that pozzuolana, which probably belongs to this class, has been used as an ingredient in mortar for the purpose of improving the quality of the same; but it has always been a secondary ingredient of comparatively small proportion to the mass, and mixed in all cases with such a superabundance of water as would prevent its being applicable to the purpose of my invention.

Having thus described my invention, what I claim as new, and desire to secure by Letters Patent, is—

1. As a new article of manufacture, an unburned brick made from tufa or tufa and lime or similar material mixed and pressed, substantially as herein described.

2. An unburned brick made from tufa or tufa and lime or similar material mixed and afterward enameled by heat, substantially as herein described.

In witness whereof I have hereunto set my hand.

ERNEST LESLIE RANSOME.

Witnesses:
S. H. NOURSE,
H. C. LEE.